United States Patent
Yu et al.

(10) Patent No.: US 9,642,199 B2
(45) Date of Patent: May 2, 2017

(54) LED DRIVER CIRCUIT AND ELECTRONIC DEVICE

(71) Applicants: BOE TECHNOLOGY GROUP CO., LTD., Beijing (CN); BOE OPTICAL SCIENCE AND TECHNOLOGY CO., LTD., Suzhou, Jiangsu (CN)

(72) Inventors: Xing Yu, Beijing (CN); Hao Su, Beijing (CN)

(73) Assignees: BOE TECHNOLOGY GROUP CO., LTD., Beijing (CN); BOE OPTICAL SCIENCE AND TECHNOLOGY CO., LTD., Suzhou, Jiangsu (CN)

( * ) Notice: Subject to any disclaimer, the term of this patent is extended or adjusted under 35 U.S.C. 154(b) by 0 days.

(21) Appl. No.: 14/888,046

(22) PCT Filed: May 21, 2015

(86) PCT No.: PCT/CN2015/079479
§ 371 (c)(1),
(2) Date: Oct. 29, 2015

(87) PCT Pub. No.: WO2016/050084
PCT Pub. Date: Apr. 7, 2016

(65) Prior Publication Data
US 2016/0270169 A1    Sep. 15, 2016

(30) Foreign Application Priority Data

Sep. 29, 2014    (CN) .................... 2014 2 0568011 U (51) Int. Cl.
*H05B 33/08*    (2006.01)
*H02M 1/44*    (2007.01)
*H02M 1/42*    (2007.01)

(52) U.S. Cl.
CPC ...... *H05B 33/0815* (2013.01); *H02M 1/4225* (2013.01); *H02M 1/44* (2013.01);
(Continued)

(58) Field of Classification Search
CPC . H02M 1/44; H05B 33/0815; H05B 33/0887; H05B 37/02; H05B 33/0812;
(Continued)

(56) References Cited

U.S. PATENT DOCUMENTS

| | | | |
|---|---|---|---|
| 2012/0206064 A1* | 8/2012 | Archenhold | H05B 33/0812 315/297 |
| 2014/0268918 A1* | 9/2014 | Gong | H02M 7/217 363/21.15 |
| 2015/0019882 A1* | 1/2015 | Irish | G06F 1/26 713/300 |

FOREIGN PATENT DOCUMENTS

| | | |
|---|---|---|
| CN | 102740561 A | 10/2012 |
| CN | 202713734 U | 1/2013 |

(Continued)

OTHER PUBLICATIONS

International Search Report and Written Opinion mailed Aug. 20, 2015 regarding PCT/CN2015/079479. Translation provided by Dragon Intellectual Property Law Firm.

*Primary Examiner* — Monica C King
(74) *Attorney, Agent, or Firm* — Harness, Dickey & Pierce, P.L.C.

(57) ABSTRACT

The present disclosure provides a light-emitting diode (LED) driver circuit and an electronic device. The LED driver circuit includes a rectifier-filter circuit configured to convert an alternating voltage into a direct voltage; a valley-filling circuit connected to the rectifier-filter circuit and configured to adjust a current waveform from the rectifier-filter circuit; a ringing choke converter (RCC) circuit connected to the valley-filling circuit and configured to control (Continued)

a direct current (DC) output; and a DC output unit connected to the RCC circuit and configured to rectify and filter an output signal from the RCC circuit so as to drive an LED load.

17 Claims, 4 Drawing Sheets

(52) U.S. Cl.
 CPC ..... *H05B 33/0809* (2013.01); *H05B 33/0887* (2013.01); *Y02B 70/126* (2013.01)

(58) Field of Classification Search
 CPC ............ H05B 33/0818; H05B 33/0845; Y02B 20/341; Y02B 20/345; Y02B 20/347
 See application file for complete search history.

(56) References Cited

FOREIGN PATENT DOCUMENTS

| | | |
|---|---|---|
| CN | 203467008 U | 3/2014 |
| CN | 203734894 U | 7/2014 |
| CN | 204206534 U | 3/2015 |
| WO | WO-2014-134918 A1 | 9/2014 |

\* cited by examiner

LED DRIVER CIRCUIT AND ELECTRONIC DEVICE

CROSS-REFERENCE TO RELATED APPLICATION

The present application is the U.S. national phase of PCT Application No. PCT/CN2015/079479 filed on May 21, 2015, which claims a priority of the Chinese patent application No. 201420568011.5 filed on Sep. 29, 2014, which is incorporated herein by reference in its entirety.

TECHNICAL FIELD

The present disclosure relates to the field of light-emitting diode (LED) driving technology, in particular to an LED driver circuit and an electronic device.

BACKGROUND

LED illumination, as a novel technique for environment-friendly illumination, has been developed rapidly in the past years. A constant-current driver circuit has now been presented so as to meet the requirements on the characteristics of the LEDs. Main technical indices for measuring LED constant-current driving include efficiency, power factor, linear adjustment rate, constant-current accuracy and various protection functions. The power factor, as an important technical index for a power system, is used to measure the efficiency of an electrical device. The lower the power factor, the larger the reactive power used by a circuit for alternating magnetic-field conversion. Hence, the utilization rate of the device is reduced, a line power loss is increased and a harmonic pollution at an input end becomes more serious.

An existing LED driver circuit includes a ringing choke converter (RCC) circuit which consists of analog elements, so it is greatly superior in cost. However, the power factor of the RCC circuit is not high, and its constant-current effect is bad. In addition, it is difficult for the conversion efficiency of the RCC circuit with an isolation structure to be up to more than 80%. Due to these defects, it is difficult for the RCC circuit to take its advantages in the LED driver circuit.

SUMMARY

A main object of the present disclosure is to provide an LED driver circuit and an electronic device, so as to drive an LED in the LED driver circuit by a constant current in a better manner and improve the conversion efficiency.

In one aspect, the present disclosure provides in one embodiment an LED driver circuit, including: a rectifier-filter circuit configured to convert an alternating voltage into a direct voltage; a valley-filling circuit connected to the rectifier-filter circuit and configured to adjust a current waveform from the rectifier-filter circuit; a RCC circuit connected to the valley-filling circuit and configured to control a direct current (DC) output; and a DC output unit connected to the RCC circuit and configured to rectify and filter an output signal from the RCC circuit so as to drive an LED load.

During the implementation, the current waveform from the rectifier-filter circuit is adjusted by the valley-filling circuit from a narrow pulse waveform to an approximate sinusoidal waveform.

During the implementation, the LED driver circuit further includes an electromagnetic interference (EMI) filtering unit, an input end of which is configured to receive the alternating voltage and an output end of which is connected to the rectifier-filter circuit, so as to suppress EMI.

During the implementation, the EMI filtering unit includes a safety fuse, a differential mode (DM) or a common mode (CM) inductor, and a safety capacitor.

During the implementation, the rectifier-filter circuit includes a bridge rectifier, a rectifier-filter DM inductor and a rectifier-filter capacitor, and the valley-filling circuit includes a first valley-filling electrolytic capacitor, a second valley-filling electrolytic capacitor, a first valley-filling diode, a second valley-filling diode, a third valley-filling diode and a valley-filling resistor. The bridge rectifier is connected to the output end of the EMI filtering unit and an input end of the valley-filling circuit, a second end of the rectifier-filter DM inductor is connected to a negative end of the LED load through the rectifier-filter capacitor, a positive plate of the first valley-filling electrolytic capacitor is connected to a first end of the rectifier-filter DM inductor, a negative plate of the first valley-filling electrolytic capacitor is connected to a cathode of the first valley-filling diode, an anode of the first valley-filling diode is connected to the negative end of the LED load, an anode of the second valley-filling diode is connected to the cathode of the first valley-filling diode, a cathode of the second valley-filling diode is connected to an anode of the third valley-filling diode through the valley-filling resistor, a cathode of the third valley-filling diode is connected to the first end of the rectifier-filter DM inductor, a positive plate of the second valley-filling electrolytic capacitor is connected to the anode of the third valley-filling diode, and a negative plate of the second valley-filling electrolytic capacitor is connected to the negative end of the LED load.

During the implementation, the RCC circuit includes a startup circuit, a self-oscillation circuit and an oscillation control circuit.

During the implementation, the startup circuit includes a high-voltage startup resistor. The self-oscillation circuit includes a transformer, which includes a primary winding and a secondary winding, and a switching tube, and the switching tube is a metal oxide semiconductor (MOS) tube. The oscillation control circuit includes a timing unit for controlling turn-off time and turn-on time of the switching tube, a voltage application unit for applying a driving voltage to the switching tube, and a switch control unit for controlling an on or off state of the switching tube.

During the implementation, the timing unit includes a timing resistor and a timing capacitor connected in series to each other, the voltage application unit includes a first voltage stabilizing diode and a voltage application resistor connected in parallel to each other, the switch control unit includes a current sampling resistor and a first transistor, a first end of the high-voltage startup resistor is connected to the second end of the rectifier-filter DM inductor, a first electrode of the switching tube is connected to the first end of the high-voltage startup resistor, a gate electrode of the switching tube is connected to a second end of the high-voltage startup resistor, a first end of the secondary winding is connected to the gate electrode of the switching tube through the timing unit, a first end of the current sampling resistor is connected to a second end of the secondary winding, a second end of the current sampling resistor is connected to a second electrode of the switching tube, a base electrode of the first transistor is connected to the second electrode of the switching tube, a collector of the first transistor is connected to the gate electrode of the switching tube, an emitter of the first transistor is connected to the first end of the current sampling resistor, an anode of the first voltage stabilizing diode is connected to the emitter of the first transistor, a cathode of the first voltage stabilizing diode is connected to the collector of the first transistor, a first end of the current sampling resistor is connected to a first end of the primary winding, a second end of the primary winding is connected to a positive end of the LED load, and the first and second ends of the primary winding are both connected to the negative end of the LED load through the DC output unit.

During the implementation, the LED driver circuit further includes an output open-circuit protection circuit connected to the non-isolated RCC circuit and configured to control, when an output open circuit occurs, the RCC circuit to stop outputting a DC signal to the DC output unit.

During the implementation, the LED driver circuit further includes a power-limited protection circuit connected to the non-isolated RCC circuit and configured limit input power.

During the implementation, the output open-circuit protection circuit includes a second voltage stabilizing diode, a second transistor, an open-circuit protection resistor, an open-circuit protection capacitor and an open-circuit protection diode, a base electrode of the second transistor is connected to an anode of the second voltage stabilizing diode, a collector of the second transistor is connected to the gate electrode of the switching tube, an emitter of the second transistor is connected to the second end of the secondary winding through the open-circuit protection capacitor, a cathode of the second voltage stabilizing diode is connected to the second end of the primary winding through the open-circuit protection resistor, an anode of the open-circuit protection diode is connected to the emitter of the second transistor, and a cathode of the open-circuit protection diode is connected to the first end of the secondary winding.

During the implementation, the power-limited protection circuit includes a third voltage stabilizing diode, a third transistor, a power-limited protection diode, a power-limited protection resistor and a power-limited protection capacitor, a base electrode of the third transistor is connected to an anode of the third voltage stabilizing diode, a collector of the third transistor is connected to the gate electrode of the switching tube, an emitter of the third transistor is connected to the first end of the current sampling resistor, a cathode of the power-limited protection diode is connected to a cathode of the third voltage stabilizing diode, and an anode of the power-limited protection diode is connected to the second end of the current sampling resistor through the power-limited protection capacitor and connected to the first end of the secondary winding through the power-limited protection resistor.

During the implementation, the DC output unit includes a DC output electrolytic capacitor, a DC output diode and a bleeder resistor, a positive plate of the DC output electrolytic capacitor is connected to the second end of the primary winding, a negative plate of the DC output electrolytic capacitor is connected to the negative end of the LED load, an anode of the DC output diode is connected to the negative end of the LED load, a cathode of the DC output diode is connected to the first end of the primary winding, and the bleeder resistor is connected in parallel to the DC output electrolytic capacitor.

During the implementation, the RCC circuit is a non-isolated RCC circuit.

In another aspect, the present disclosure provides in one embodiment an electronic device including an LED load and the above-mentioned LED driver circuit for driving the LED load.

According to the LED driver circuit and the electronic device in the embodiments of the present disclosure, the non-isolated RCC circuit is adopted, and meanwhile the valley-filling circuit is provided so as to improve the power factor, thereby to drive the LED by the constant current in a more effective manner and improve the conversion efficiency.

DETAILED DESCRIPTION

The present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
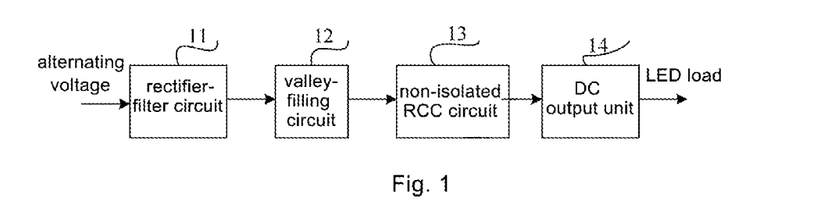
FIG. 1 is a block diagram of an LED driver circuit according to one embodiment of the present disclosure.

As shown in FIG. 1, an LED driver circuit according to one embodiment of the present disclosure includes a rectifier-filter circuit 11 configured to convert an alternating voltage into a direct voltage, a valley-filling circuit 12 connected to the rectifier-filter circuit 11 and configured to adjust a current waveform from the rectifier-filter circuit 11 so as to improve a power factor, a non-isolated RCC circuit 13 connected to the valley-filling circuit 12 and configured to control DC output, and a DC output unit 14 connected to the non-isolated RCC circuit 13 and configured to rectify and filter an output signal from the non-isolated RCC circuit 13 to drive an LED load.

According to the LED driver circuit in the embodiment of the present disclosure, the non-isolated RCC circuit is adopted so as to enable the conversion efficiency of the LED driver circuit to be more than 90%, reduce the heat generated by circuit elements and improve a service life of the LED driver circuit, thereby to improve a service life of the entire LED lamp.

According to the LED driver circuit in the embodiment of the present disclosure, the valley-filling circuit is adopted to adjust the current waveform after the rectification and filtration from a narrow pulse waveform to an approximate sinusoidal waveform, so as to enable the power factor of the LED driver circuit to be more than 0.9, thereby to drive the LED by a constant current in a more effective manner, improve a utilization rate of a power network, reduce the harmonic pollution, and reduce output current ripples.

Figure 2:
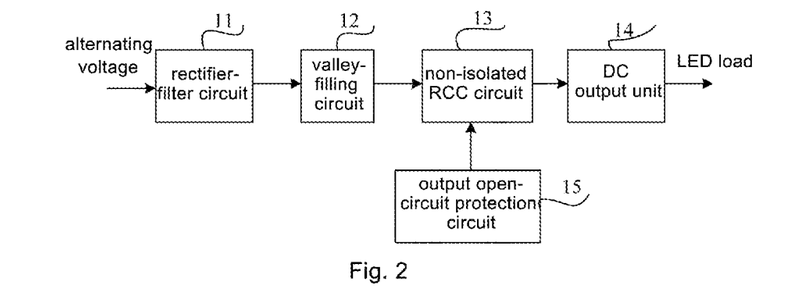
FIG. 2 is another block diagram of the LED driver circuit according to one embodiment of the present disclosure.

To be specific, as shown in FIG. 1 in conjunction with FIG. 2, the LED driver circuit may further include an output open-circuit protection circuit 15 connected to the non-isolated RCC circuit 13 and configured to, when an output open circuit occurs, control the non-isolated RCC circuit to stop outputting a DC signal to the DC output unit 14. The output open-circuit protection circuit 15 may be used to prevent the LED load from being damaged when the output open circuit occurs.

Figure 3:
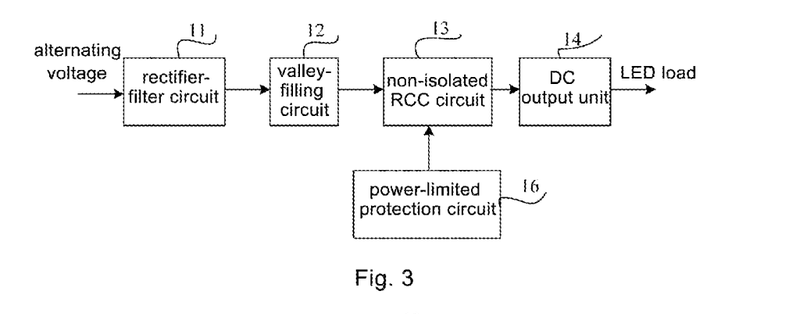
FIG. 3 is yet another block diagram of the LED driver circuit according to one embodiment of the present disclosure.

To be specific, as shown in FIG. 1 in conjunction with FIG. 3, the LED driver circuit may further include a power-limited protection circuit 16 connected to the non-isolated RCC circuit 13 and configured to limit input power of the non-isolated RCC circuit from increasing along with an increase in an input voltage. The power-limited protection circuit 16 may be used to improve the constant current accuracy of the driver circuit, and prevent the input power of the driver circuit from increasing along with an increase in the input voltage, thereby to improve the linear adjustment rate.

Figure 4:
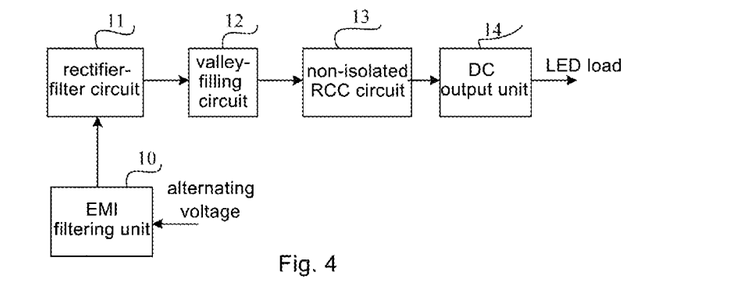
FIG. 4 is still yet another block diagram of the LED driver circuit according to one embodiment of the present disclosure.

To be specific, as shown in FIG. 1 in conjunction with FIG. 4, the LED driver circuit may further includes an EMI filtering unit 10, an input end of which is configured to receive the alternating voltage and an output end of which is connected to the rectifier-filter circuit 11, so as to suppress EMI. The EMI filtering unit 10 may include a safety fuse, a differential mode (DM) or a common mode (CM) inductor, and a safety capacitor. It may be used to filter the interference of a high-frequency pulse from an external power network on the driver circuit and suppress the electromagnetic interference caused by the driver circuit itself on the external environment, thereby to enable the LED driver circuit to conform to the standards on radiated electromagnetic interference and interference voltage as defined in GB17743-2007.

To be specific, the above embodiments may be used in combination at random.

The circuit structure of the LED driver circuit will be described hereinafter.

Figure 5:
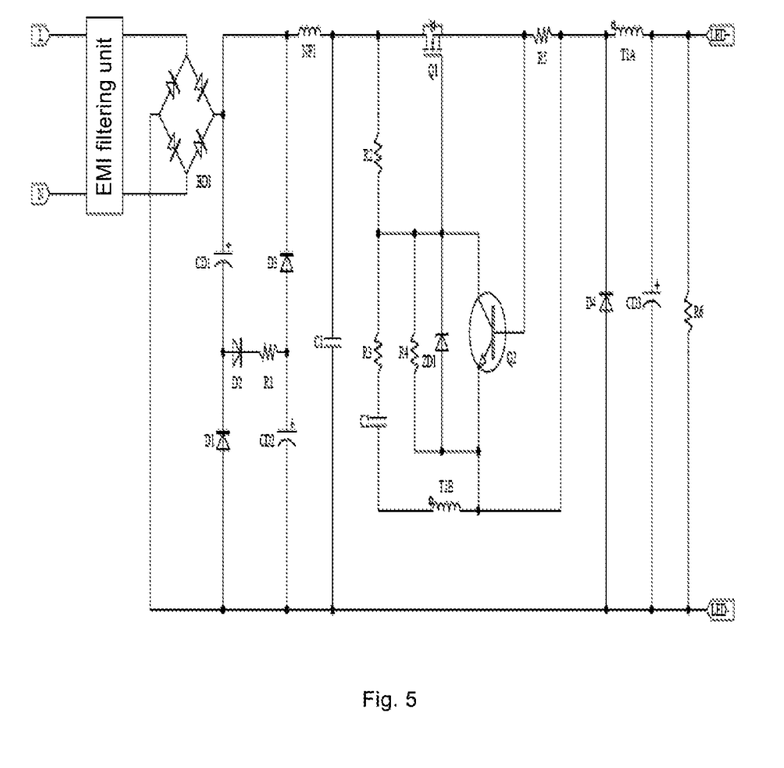
FIG. 5 is a circuit diagram of the LED driver circuit according to one embodiment of the present disclosure.

As shown in FIG. 5, the LED driver circuit includes an EMI filtering unit, a rectifier-filter circuit, a valley-filling circuit, a non-isolated RCC circuit and a DC output unit. The rectifier-filter circuit includes a bridge rectifier BD1, a rectifier-filter DM inductor NF1 and a rectifier-filter capacitor C1. The valley-filling circuit includes a first valley-filling electrolytic capacitor CD1, a second valley-filling electrolytic capacitor CD2, a first valley-filling diode D1, a second valley-filling diode D2, a third valley-filling diode D3 and a valley-filling resistor R1. The bridge rectifier BD1 is connected to an output end of the EMI filtering unit and an input end of the valley-filling circuit, a second end of the rectifier-filter DM inductor NF1 is connected to a negative end LED– of the LED load through the rectifier-filter capacitor C1, a positive plate of the first valley-filling electrolytic capacitor CD1 is connected to a first end of the rectifier-filter DM inductor NF1, a negative plate of the first valley-filling electrolytic capacitor is connected to a cathode of the first valley-filling diode D1, an anode of the first valley-filling diode D1 is connected to the negative end LED– of the LED load, an anode of the second valley-filling diode D2 is connected to the cathode of the first valley-filling diode D1, a cathode of the second valley-filling diode is connected to an anode of the third valley-filling diode D3 through the valley-filling resistor R1, a cathode of the third valley-filling diode D3 is connected to the first end of the rectifier-filter DM inductor NF1, a positive plate of the second valley-filling electrolytic capacitor CD2 is connected to the anode of the third valley-filling diode D3, and a negative plate of the second valley-filling electrolytic capacitor is connected to the negative end LED– of the LED load.

The non-isolated RCC circuit includes a startup circuit, a self-oscillation circuit and an oscillation control circuit. The startup circuit includes a high-voltage startup resistor R2. The self-oscillation circuit includes a transformer, which includes a primary winding T1A and a secondary winding T1B, and a switching tube Q1, and the switching tube is an MOS tube. The oscillation control circuit includes a timing unit for controlling turn-off time and turn-on time of the switching tube Q1, a voltage application unit for applying a driving voltage to the switching tube Q1, and a switch control unit for controlling an on or off state of the switching tube Q1.

The timing unit includes a timing resistor R3 and a timing capacitor C2 connected in series to each other. The voltage application unit includes a first voltage stabilizing diode ZD1 and a voltage application resistor R4 connected in parallel to each other. The switch control unit includes a current sampling resistor R5 and a first transistor Q2. A first end of the high-voltage startup resistor R2 is connected to the second end of the rectifier-filter DM inductor NF1, a first electrode of the switching tube Q1 is connected to the first end of the high-voltage startup resistor R2, and a gate electrode of the switching tube is connected to a second end of the high-voltage startup resistor R2. A first end of the secondary winding T1B is connected to the gate electrode of the switching tube Q1 through the timing unit. A first end of the current sampling resistor R5 is connected to a second end of the secondary winding T1B, and a second end of the current sampling resistor is connected to a second electrode of the switching tube Q1. A base electrode of the first transistor Q2 is connected to the second electrode of the switching tube Q1, a collector of the first transistor is connected to the gate electrode of the switching tube Q1, and an emitter of the first transistor is connected to the first end of the current sampling resistor R5. An anode of the first voltage stabilizing diode ZD1 is connected to the emitter of the first transistor Q2, and a cathode of the first voltage stabilizing diode is connected to the collector of the first transistor Q2. A first end of the current sampling resistor R5 is connected to a first end of the primary winding T1A, and a second end of the primary winding is connected to a positive end LED+ of the LED load. The first and second ends of the primary winding T1A are both connected to the negative end LED– of the LED load through the DC output unit.

The DC output unit includes a DC output electrolytic capacitor CD3, a DC output diode D4 and a bleeder resistor R6. A positive plate of the DC output electrolytic capacitor CD3 is connected to the second end of the primary winding T1A, and a negative plate of the DC output electrolytic capacitor is connected to the negative end LED− of the LED load. An anode of the DC output diode D4 is connected to the negative end LED− of the LED load, and a cathode of the DC output diode is connected to the first end of the primary winding T1A. The bleeder resistor R6 is connected in parallel to the DC output electrolytic capacitor CD3.

As shown in FIG. 5, L represents a live wire, N represents a null wire, the first electrode of the switching tube Q1 is a drain electrode, and the second electrode of the switching tube Q1 is a source electrode.

In the LED driver circuit as shown in FIG. 5, the rectifier-filter circuit is configured to convert the alternating voltage into the direct voltage, and the valley-filling circuit is configured to adjust the current waveform after the rectification and filtration from a narrow pulse waveform to an approximate sinusoidal waveform, so as to improve the power factor, reduce the total harmonic distortion and improve the power supply quality of the power network.

In the non-isolated RCC circuit, R2 represents the high-voltage startup resistor, R2 and C2 form together an RC timing circuit, the turn-on time and the turn-off time of the switching tube Q1 directly depend on the capacitance of C2 and the resistance of R3, a stable driving voltage is applied by R4 and ZD1 to Q1, R5 represents the current sampling resistor, the switching tube Q1 is a main switching tube, and Q2 serves as a switch.

In the DC output unit, D4 and CD3 may filter an output voltage into a smooth DC voltage. When the input voltage is not applied, the bleeder resistor R6 may release charges on the electrolytic capacitor CD3. The resistance of R6 may be selected appropriately, and it may not be too small; otherwise, the conversion efficiency of the entire driver circuit may be adversely affected.

The working procedure of the LED driver circuit in FIG. 5 will be described hereinafter.

After an input alternating voltage of 220V is applied to the EMI filtering unit, the rectifier-filter circuit and the valley-filling circuit, a voltage with a maximum value of 310V is formed. This voltage is applied sequentially to an electrode D (drain electrode) and an electrode S (source electrode) of Q1, the current sampling resistor T5, the primary winding T1A of the transformer and CD3, and finally back to the negative end LED− of the LED load. Meanwhile, the voltage with a maximum value of 310V is applied to the gate electrode of Q1 through the startup resistor R2 so as to turn on Q1. At this time, a self-oscillation circuit consisting of Q1 and the primary winding T1A of the transformer starts to operate, and there is a current flowing through T1A. Due to the mutual inductance, a corresponding induced electromotive force is generated by the secondary winding T1B of the transformer, so as to charge C2 and then be applied onto the gate electrode of the switching tube Q1, thereby to enable Q1 to be in a saturation state rapidly. Along with an increase in the current flowing through the primary winding T1A, a voltage across R5 increases continuously. When the voltage increases to be a turn-on voltage for the base electrode of Q2, Q2 is turned on, so as to pull down a gate voltage of the switching tube Q1, thereby to turn off Q1. When Q1 is in the off state, the LED load is powered and CD3 is charged by the primary winding T1A through D4, and C2 is discharged by the secondary winding T1B, so as to be ready for a next cycle.

During the actual operation, the on and off states of the switching tube may be controlled by detecting an output voltage when the open circuit occurs, so as to achieve the output open-circuit protection.

Figure 6:
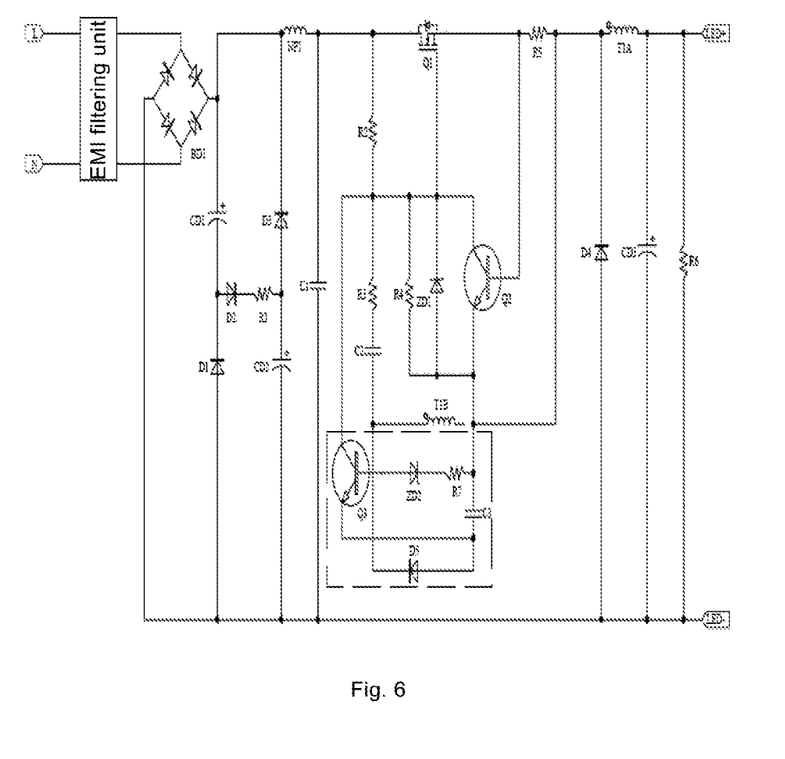
FIG. 6 is another circuit diagram of the LED driver circuit according to one embodiment of the present disclosure.

As shown in FIG. 6, which is another circuit diagram of the LED driver circuit, the LED driver circuit further includes, on the basis of the structure in FIG. 5, an output open-circuit protection circuit (shown by the dashed box). The output open-circuit protection circuit includes a second voltage stabilizing diode ZD2, a second transistor Q3, an open-circuit protection resistor R7, an open-circuit protection capacitor C3 and an open-circuit protection diode D5. A base electrode of the second transistor Q3 is connected to an anode of the second voltage stabilizing diode ZD2, a collector of the second transistor is connected to the gate electrode of the switching tube Q1, and an emitter of the second transistor is connected to the second end of the secondary winding T1B through the open-circuit protection resistor C3. A cathode of the second voltage stabilizing diode ZD2 is connected to the second end of the secondary winding T1B through the open-circuit protection resistor R7. An anode of the open-circuit protection diode D5 is connected to the emitter of the second transistor Q3, and a cathode of the open-circuit protection diode is connected to the first end of the secondary winding T1B.

The working procedure of the output open-circuit protection circuit included in the LED driver circuit in FIG. 6 will be described as follows. When the output open circuit occurs, an output voltage increases. Due to the mutual inductance, the induced electromotive force generated by the secondary winding T1B of the transformer breaks through ZD2 via R7, so as to apply the turn-on voltage to the base electrode of Q3 and turn on Q3, thereby to pull down the gate potential of the switching tube Q1. At this time, Q1 stops operating, and D5 functions as to break the circuit, so as to prevent a false action during the normal operation.

Figure 7:
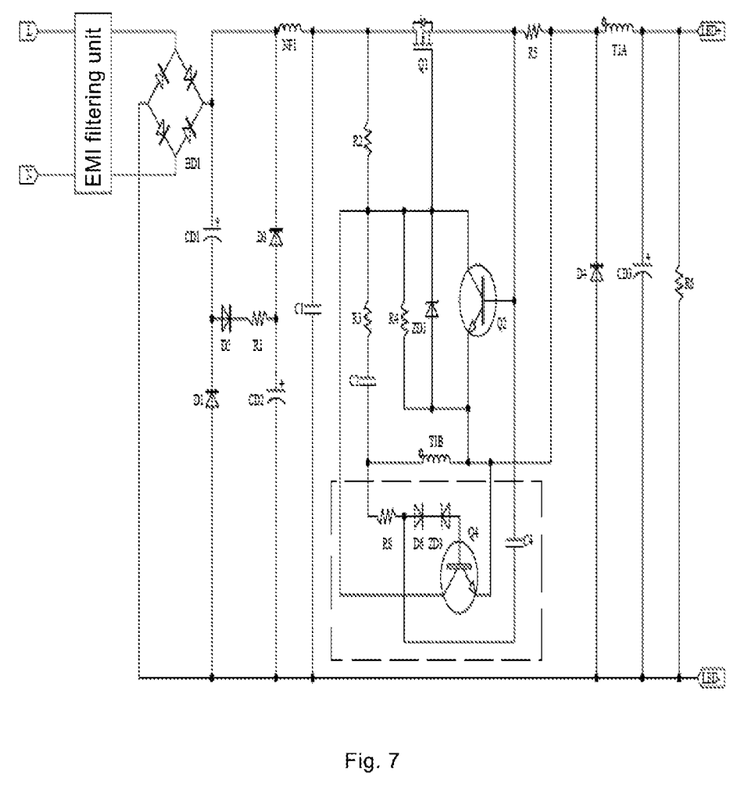
FIG. 7 is yet another circuit diagram of the LED driver circuit according to one embodiment of the present disclosure.

As shown in FIG. 7, which is yet another circuit diagram of the LED driver circuit, the LED driver circuit further includes, on the basis of the structure in FIG. 5, a power-limited protection circuit. The power-limited protection circuit includes a third voltage stabilizing diode ZD3, a third transistor Q4, a power-limited protection diode D6, a power-limited protection resistor R8 and a power-limited protection capacitor C4. A base electrode of the third transistor Q4 is connected to an anode of the third voltage stabilizing diode ZD3, a collector of the third transistor is connected to the gate electrode of the switching tube Q1, and an emitter of the third transistor is connected to the first end of the current sampling resistor R5. A cathode of the power-limited protection diode D6 is connected to a cathode of the third voltage stabilizing diode ZD3, and an anode of the power-limited protection diode is connected to the second end of the current sampling resistor R5 through the power-limited protection capacitor C4 and connected to the first end of the secondary winding T1B through the power-limited protection resistor R8.

The operating procedure of the power-limited protection circuit included in the LED driver circuit in FIG. 7 will be described as follows. Along with an increase in the input voltage, the voltage across the primary winding T1A of the transformer increases (in the case that an output load is constant), and the voltage across of the secondary winding T1B increases too. When the voltage reaches a certain value, the voltage across T1B breaks through ZD3 via R8 and D6, so as to apply the turn-on voltage to the base electrode of Q4 and turn on Q4, thereby to pull down the gate potential of the switching tube Q1. At this time, Q1 is in the off state, and an operating frequency of the switching tube Q1 is controlled, so as to provide a constant current and limit the input power. C4 provides compensation functions.

The present disclosure further provides in one embodiment an electronic device including an LED load and the above-mentioned LED driver circuit for driving the LED load.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A light-emitting diode (LED) driver circuit, comprising:
   a rectifier-filter circuit configured to convert an alternating voltage into a direct voltage;
   a valley-filling circuit connected to the rectifier-filter circuit and configured to adjust a current waveform from the rectifier-filter circuit;
   a ringing choke converter (RCC) circuit connected to the valley-filling circuit and configured to control a direct current (DC) output; and
   a DC output unit connected to the RCC circuit and configured to rectify and filter an output signal from the RCC circuit so as to drive an LED load,
   wherein
   the rectifier-filter circuit comprises a bridge rectifier, a rectifier-filter differential mode (DM) inductor and a rectifier-filter capacitor,
   the valley-filling circuit comprises a first valley-filling electrolytic capacitor, a second valley-filling electrolytic capacitor, a first valley-filling diode, a second valley-filling diode, a third valley-filling diode and a valley-filling resistor,
   the bridge rectifier is connected to an output end of an electromagnetic interference (EMI) filtering unit and an input end of the valley-filling circuit,
   a second end of the rectifier-filter DM inductor is connected to a negative end of the LED load through the rectifier-filter capacitor,
   a positive plate of the first valley-filling electrolytic capacitor is connected to a first end of the rectifier-filter DM inductor,
   a negative plate of the first valley-filling electrolytic capacitor is connected to a cathode of the first valley-filling diode,
   an anode of the first valley-filling diode is connected to the negative end of the LED load,
   an anode of the second valley-filling diode is connected to the cathode of the first valley-filling diode,
   a cathode of the second valley-filling diode is connected to an anode of the third valley-filling diode through the valley-filling resistor,
   a cathode of the third valley-filling diode is connected to the first end of the rectifier-filter DM inductor,
   a positive plate of the second valley-filling electrolytic capacitor is connected to the anode of the third valley-filling diode, and
   a negative plate of the second valley-filling electrolytic capacitor is connected to the negative end of the LED load.

2. The LED driver circuit according to claim 1, wherein the current waveform from the rectifier-filter circuit is adjusted by the valley-filling circuit from a narrow pulse waveform to an approximate sinusoidal waveform.

3. The LED driver circuit according to claim 1, wherein an input end of the EMI filtering unit is configured to receive the alternating voltage and an output end of the EMI filtering unit is connected to the rectifier-filter circuit, so as to suppress EMI.

4. The LED driver circuit according to claim 3, wherein the EMI filtering unit comprises a safety fuse, a DM or a common mode (CM) inductor, and a safety capacitor.

5. The LED driver circuit according to claim 1, wherein the RCC circuit comprises a startup circuit, a self-oscillation circuit and an oscillation control circuit.

6. The LED driver circuit according to claim 5, wherein the startup circuit comprises a high-voltage startup resistor;
   the self-oscillation circuit comprises a transformer, which comprises a primary winding, a secondary winding, and a switching tube;
   the switching tube is a metal oxide semiconductor (MOS) tube; and
   the oscillation control circuit comprises
   a timing unit for controlling turn-off time and turn-on time of the switching tube,
   a voltage application unit for applying a driving voltage to the switching tube, and
   a switch control unit for controlling an on or off state of the switching tube.

7. The LED driver circuit according to claim 6, wherein the timing unit comprises a timing resistor and a timing capacitor connected in series to each other;
   the voltage application unit comprises a first voltage stabilizing diode and a voltage application resistor connected in parallel to each other;
   the switch control unit comprises a current sampling resistor and a first transistor;
   a first end of the high-voltage startup resistor is connected to the second end of the rectifier-filter DM inductor;
   a first electrode of the switching tube is connected to the first end of the high-voltage startup resistor;
   a gate electrode of the switching tube is connected to a second end of the high-voltage startup resistor;
   a first end of the secondary winding is connected to the gate electrode of the switching tube through the timing unit;
   a first end of the current sampling resistor is connected to a second end of the secondary winding;
   a second end of the current sampling resistor is connected to a second electrode of the switching tube;
   a base electrode of the first transistor is connected to the second electrode of the switching tube;
   a collector of the first transistor is connected to the gate electrode of the switching tube;
   an emitter of the first transistor is connected to the first end of the current sampling resistor;
   an anode of the first voltage stabilizing diode is connected to the emitter of the first transistor;
   a cathode of the first voltage stabilizing diode is connected to the collector of the first transistor;
   a first end of the current sampling resistor is connected to a first end of the primary winding;
   a second end of the primary winding is connected to a positive end of the LED load; and
   the first and second ends of the primary winding are both connected to the negative end of the LED load through the DC output unit.

8. The LED driver circuit according to claim 1, further comprising an output open-circuit protection circuit connected to the RCC circuit and configured to control, when an output open circuit occurs, the RCC circuit to stop outputting a DC signal to the DC output unit.

9. The LED driver circuit according to claim 1, further comprising a power-limited protection circuit connected to the RCC circuit and configured limit input power.

10. The LED driver circuit according to claim 8, wherein:
the output open-circuit protection circuit comprises a second voltage stabilizing diode, a second transistor, an open-circuit protection resistor, an open-circuit protection capacitor and an open-circuit protection diode;
a base electrode of the second transistor is connected to an anode of the second voltage stabilizing diode;
a collector of the second transistor is connected to gate electrode of a switching tube;
an emitter of the second transistor is connected to the second end of the secondary winding through the open-circuit protection capacitor;
a cathode of the second voltage stabilizing diode is connected to the second end of the primary winding through the open-circuit protection resistor;
an anode of the open-circuit protection diode is connected to the emitter of the second transistor; and
a cathode of the open-circuit protection diode is connected to the first end of the secondary winding.

11. The LED driver circuit according to claim 9, wherein the power-limited protection circuit comprises a third voltage stabilizing diode, a third transistor, a power-limited protection diode, a power-limited protection resistor and a power-limited protection capacitor;
a base electrode of the third transistor is connected to an anode of the third voltage stabilizing diode;
a collector of the third transistor is connected to a gate electrode of a switching tube;
an emitter of the third transistor is connected to a first end of a current sampling resistor;
a cathode of the power-limited protection diode is connected to a cathode of the third voltage stabilizing diode; and
an anode of the power-limited protection diode is connected to a second end of the current sampling resistor through the power-limited protection capacitor and to the first end of the secondary winding through the power-limited protection resistor.

12. The LED driver circuit according to claim 6, wherein the DC output unit comprises a DC output electrolytic capacitor, a DC output diode and a bleeder resistor;
a positive plate of the DC output electrolytic capacitor is connected to the second end of the primary winding;
a negative plate of the DC output electrolytic capacitor is connected to the negative end of the LED load;
an anode of the DC output diode is connected to the negative end of the LED load;
a cathode of the DC output diode is connected to the first end of the primary winding; and
the bleeder resistor is connected in parallel to the DC output electrolytic capacitor.

13. The LED driver circuit according to claim 1, wherein the RCC circuit is a non-isolated RCC circuit.

14. An electronic device comprising:
a light-emitting diode (LED) load; and
the LED driver circuit according to claim 1 for driving the LED load.

15. The LED driver circuit according to claim 2, further comprising an electromagnetic interference (EMI) filtering unit, wherein:
an input end of the EMI filtering unit is configured to receive the alternating voltage; and
an output end of the EMI filtering unit is connected to the rectifier-filter circuit to suppress EMI.

16. A light-emitting diode (LED) driver circuit, comprising:
a rectifier-filter circuit configured to convert an alternating voltage into a direct voltage;
a valley-filling circuit connected to the rectifier-filter circuit and configured to adjust a current waveform from the rectifier-filter circuit;
a ringing choke converter (RCC) circuit connected to the valley-filling circuit and configured to control a direct current (DC) output; and
a DC output unit connected to the RCC circuit and configured to rectify and filter an output signal from the RCC circuit so as to drive an LED load,
wherein
the RCC circuit comprises a startup circuit, a self-oscillation circuit and an oscillation control circuit,
the startup circuit comprises a high-voltage startup resistor,
the self-oscillation circuit comprises a transformer, which comprises a primary winding and a secondary winding, and a switching tube, wherein the switching tube is a metal oxide semiconductor (MOS) tube,
the oscillation control circuit comprises
a timing unit for controlling turn-off time and turn-on time of the switching tube,
a voltage application unit for applying a driving voltage to the switching tube, and
a switch control unit for controlling an on or off state of the switching tube,
the timing unit comprises a timing resistor and a timing capacitor connected in series to each other,
the voltage application unit comprises a first voltage stabilizing diode and a voltage application resistor connected in parallel to each other,
the switch control unit comprises a current sampling resistor and a first transistor,
a first end of the high-voltage startup resistor is connected to an end of a rectifier-filter differential mode inductor,
a first electrode of the switching tube is connected to the first end of the high-voltage startup resistor,
a gate electrode of the switching tube is connected to a second end of the high-voltage startup resistor,
a first end of the secondary winding is connected to the gate electrode of the switching tube through the timing unit,
a first end of the current sampling resistor is connected to a second end of the secondary winding,
a second end of the current sampling resistor is connected to a second electrode of the switching tube,
a base electrode of the first transistor is connected to the second electrode of the switching tube,
a collector of the first transistor is connected to the gate electrode of the switching tube,
an emitter of the first transistor is connected to the first end of the current sampling resistor,
an anode of the first voltage stabilizing diode is connected to the emitter of the first transistor,
a cathode of the first voltage stabilizing diode is connected to the collector of the first transistor,
a first end of the current sampling resistor is connected to a first end of the primary winding,
a second end of the primary winding is connected to a positive end of the LED load, and
the first and second ends of the primary winding are both connected to a negative end of the LED load through the DC output unit.

17. A light-emitting diode (LED) driver circuit, comprising:
- a rectifier-filter circuit configured to convert an alternating voltage into a direct voltage;
- a valley-filling circuit connected to the rectifier-filter circuit and configured to adjust a current waveform from the rectifier-filter circuit;
- a ringing choke converter (RCC) circuit connected to the valley-filling circuit and configured to control a direct current (DC) output;
- a DC output unit connected to the RCC circuit and configured to rectify and filter an output signal from the RCC circuit so as to drive an LED load; and
- an output open-circuit protection circuit connected to the RCC circuit and configured to control, when an output open circuit occurs, the RCC circuit to stop outputting a DC signal to the DC output unit, wherein the output open-circuit protection circuit comprises a second voltage stabilizing diode, a second transistor, an open-circuit protection resistor, an open-circuit protection capacitor and an open-circuit protection diode, a base electrode of the second transistor is connected to an anode of the second voltage stabilizing diode, a collector of the second transistor is connected to a gate electrode of a switching tube, an emitter of the second transistor is connected to a second end of the secondary winding through the open-circuit protection capacitor, a cathode of the second voltage stabilizing diode is connected to a second end of the primary winding through the open-circuit protection resistor, an anode of the open-circuit protection diode is connected to the emitter of the second transistor, and a cathode of the open-circuit protection diode is connected to a first end of the secondary winding.

* * * * *